United States Patent

[11] 3,596,071

| [72] | Inventor | George I. Doering<br>Columbus, Ohio |
|---|---|---|
| [21] | Appl. No. | 438,992 |
| [22] | Filed | Mar. 11, 1965 |
| [45] | Patented | July 27, 1971 |
| [73] | Assignee | Industrial Nucleonics Corporation |

[54] METHOD AND APPARATUS FOR A MATERIAL TREATER
26 Claims, 7 Drawing Figs.

[52] U.S. Cl. .................................................. 235/151.1,
235/151.3, 235/151.35, 118/8
[51] Int. Cl. ..................................................... G06g 7/58
[50] Field of Search ........................................... 235/151,
151.1, 151.11, 151.12, 151.13, 151.2, 151.3,
151.33, 151.35; 118/8, 9; 73/23, 150; 117/66

[56] References Cited
UNITED STATES PATENTS

| 2,922,475 | 1/1960 | Alexander | 162/252 |
| 3,065,466 | 11/1962 | Hickman | 118/9 X |
| 3,190,261 | 6/1965 | Ziffer | 118/8 |
| 3,260,642 | 7/1966 | Canter, Jr. | 235/151.1 UX |
| 3,073,153 | 1/1963 | Petitjean | 73/73 UX |

FOREIGN PATENTS
836,436   3/1952   Germany.....................

OTHER REFERENCES
Cochrane, Jr., Staubitz and Van Horne, " Computers Team with Nuclear Gages to Control a Paper Saturating Process" ; Control Engineering Magazine, December, 1955

Levine, " Automatic Resin Content Control in High Pressure Laminate Manufacture," Modern Plastics, May, 1958

Primary Examiner—Malcolm A. Morrison
Assistant Examiner—Joseph F. Ruggiero
Attorneys—C. Henry Peterson, William T. Fryer, III, James J. O'Reilly and Cushman, Darby & Cushman ABSTRACT: A material-treating process in which the percent weight of coating relative to the measured dry weight of a host material is computed. In application to resin-impregnating process, the percent volatiles in a sheet is computed by measuring the total weight of the dried sheet and computing the ratio of the weight of volatiles in the sheet to the measured total dried sheet weight. Radiation gauges are provided which respond to the weight per unit area of the sheet being measured and a dielectric measuring gauge that responds to the moisture content of the uncoated sheet.

PATENTED JUL 27 1971 3,596,071

INVENTOR.
George I. Doering

BY
James J. O'Reilly
AGENT

METHOD AND APPARATUS FOR A MATERIAL TREATER

This invention relates generally to material-treating processes and more particularly to an improved method and means for controlling a material coating or impregnating operation.

Control of coating processes has been attempted in the past by measuring the weight of the coated material and subtracting from it the weight of the base material entering the coating unit. It is usually desired to maintain the amount of coating proportional to the weight of the base material on which it is applied. Since the input material frequently may contain an indeterminate amount of water, which may later be evaporated, a computation of the percent coating based on the total weight of the base material will be in error when related to the weight of the dried material.

The present invention is particularly useful in processes for fabrication of laminated construction sheet boards that are coated with impregnating materials such as resins. One type of board typically used in table or sink-counter construction consists of a plurality of layers. Each layer comprises a fibrous sheet material impregnated with a material such as resin that bonds together over-and-underlying sheets when a stack of them is subjected to heat or mechanical pressure. The bonding resins are contained in a volatile solution which is applied or coated to the sheet material. After the resin-volatile solution is applied, the sheet is passed through an extensive drying unit where some of the volatiles as well as some of the water is driven off.

The quality of the laminated end product depends on both the amount of resin and the amount of volatile products contained in the dried sheet. If insufficient resins are present, inferior bonding results when the sheets are laminated. An overabundance of resins is wasteful and affects the appearance of the laminated product since it will work out and even bleed through adjacent layers when pressure is applied. The amount of volatiles in the dried sheet affect, inter alia, the ease with which the dried sheets can be handled by a sheet stacker which usually feeds the press. Dry sheets are difficult to manage and too many volatiles in the sheet is wasteful and represents an excess which cannot be recovered and reused.

In the past, systems have attempted to measure the percent resin content of the sheet by employing a gauge before the resin applicator or coater and after the drier to measure the weight of the uncoated sheet and the weight of the coated and dried sheet and subtracting one measurement from the other. It has been difficult to calculate an accurate percent resin by this method because of several factors. One, due to the long transport time required to get the sheet through the drier, the afterdrier gauge is measuring material considerably removed from the region of the first gauge. Secondly, the afterdrier gauge is measuring a certain weight of volatiles that is not taken into account. For example, it is conceivable that the gauge will read the same when a decrease in resin content is accompanied by a proportionately greater increase in volatile content. The system is therefore insensitive to the loss in resin content. Thirdly, the first gauge unavoidably measures, in a typical process, an indeterminate amount of moisture or water, some of which is driven off with the volatiles in the drier. For purposes of this disclosure, the term volatiles refers not only to the liquid solvent used to carry the resins but also to the water present in the dried sheet. As a result, not only does the two-gauge system not known how much of the first measurement is due to the water in the raw fiber being coated, but it also does not known how much of this water remains in the sheet after it is dried. In one prior system, an attempt has been made to compensate for the effect of the water in the raw fiber sheet to be coated by providing the percent resin content computer with a moisture correction dial which the operator used to insert into the computer a constant representing his estimate of the percent moisture content of the raw fiber sheet. This dial has about the same effect on the computer output as multiplying the before-the-coater gauge weight reading $W_a$ by the constant factor $[1-(M_c/100)]$ where the constant $M_c$ is the operator's estimate of the percent moisture content of the raw fiber sheet as set in manually on the moisture correction dial.

The present invention improves considerably the accuracy with which a coating can be applied to a host material that may or may not have a variable moisture content. This is accomplished by measuring the dry weight of the host material and computing the percent weight of said coating relative to this measured dry weight. My invention has particular application to a resin-impregnating process wherein a volatile mixture of resins is applied to the host material and the total weight of the resins relative to the dry weight of the host material is computed. Since the impregnated sheet is subsequently dried, I compute the percent volatiles in the sheet by measuring the total weight of the dried sheet and computing the ratio of the weight of volatiles in the sheet to the measured total dried sheet weight. I have found it also useful to employ radiation gauges that respond to the weight per unit area of the sheet being measured and a dielectric measuring gauge that responds to the moisture content of the uncoated sheet.

In conjunction with the foregoing measuring methods and apparatuses, I also provide suitable control systems whereby the percent resins and the percent volatiles in said sheet can be maintained at their respective desired values.

Accordingly, it is a primary object of the present invention to provide a novel method and apparatus for accurately measuring and/or controlling the amount of material deposited on a host material.

It is also an object of the present invention to provide a method and apparatus for measuring and/or controlling the resin and volatile content of an impregnated sheet.

It is yet another object of the present invention to provide a measuring and controlling system for a material impregnating process that maintains the proportion of the impregnating material in said dried sheet constant regardless of moisture variations in the host material being impregnated.

It is still another object of the present invention to provide a control system for a resin-impregnating process that significantly reduces the waste of impregnating materials resulting from excessive application thereof.

These and other objects of the present invention will become more apparent from the following description when taken in conjunction with the drawings, in which.

Figure 1:
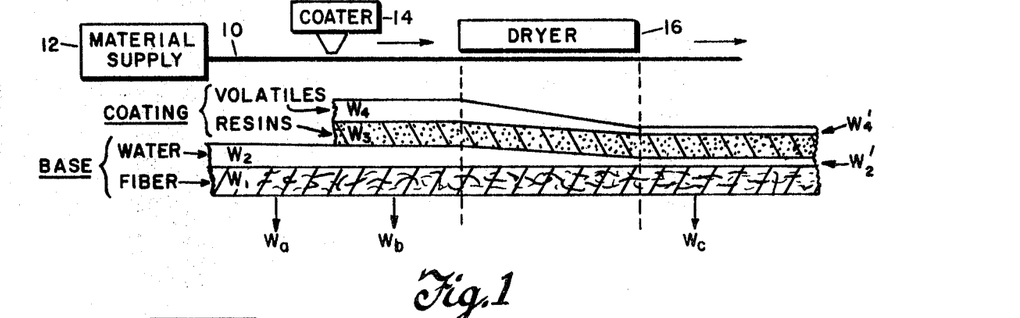
FIG. 1 is a diagrammatic view, of a coating process flow diagram useful in explaining the operation of the present invention.

With reference now to the drawings and specifically to FIG. 1, my invention is described in connection with a material-coating process wherein a coating material is applied to or deposited on a base material 10 provided by a material supply 12. A coater 14 may apply the coating to one side or both sides of the material 10. In some cases, the coating material may stay on the surface of the base material 10 and in other cases, the coating may be absorbed by the base or host material so as to impregnate the same. The term material coater may be constructed to refer to either of these physical mechanisms and the present invention provides advantages in either case. The coater 14 may or may not be followed by a drier unit 16 depending on the relative "wetness" of the coating and base material.

As an example of a coating process, I have chosen to illustrate a resin-impregnating line wherein a resin-volatile coating is applied to a fibrous base material containing an indeterminate amount of water. The coating could just as well be any of the well-known mixtures applied to a porous or permeable host material to either increase its strength or improve its finish.

It is usually desirable to maintain the amount or weight of coating relative to the weight of the base constant. In the case of the resin-impregnating process, it is desirable to keep the weight of the solid resins added by the coater 14 relative to the weight of dry fiber at a value picked for economic reasons affecting both the quality of product produced as well as the ease with which it can be handled.

To best understand the relative weight proportions that are desired in this industrial process, particular reference can be made to the graphical weight diagram shown immediately beneath and in registration with the process flow diagram of FIG. 1. Frequent reference is made hereinafter to the weights $W_a$, $W_b$; and $W_c$ that exist in the process at a location or area immediately before the coater 14, immediately after the coater 14, and immediately after the drier 16 respectively. It may be seen that the raw material commonly provided by the material supply 12 is composed of a dry fiber weight $W_1$ and a wet weight $W_2$ of water (represented diagrammatically here as on top of the dry fiber. The coater 14 deposits on the base sheet a varnish mixture of resins and volatiles of respective weights $W_3$ and $W_4$. The volatiles may be alcohols or aqueous suspensions that serve to carry or suspend the solid resins. Therefore, the aftercoater weight $W_b$ includes the combined weights of fiber, water, resin and volatiles. In this disclosure, the terms "weight," "basis weight" and "weight per unit area" are used interchangeably and synonymously. while the sectional illustration of the various weights seem to indicate a stratified relationship between the various materials, it is appreciated that this is merely a pictorial rather than an actual representation of what occurs in the impregnation and drying mechanisms of this process.

Within the drier 16, the weights $W_2$ of water and $W_4$ volatiles decrease significantly while the dry pulp fiber $W_1$ and the solid resin weight $W_3$ of course remain constant. The weight $W_c$ after the drier 16 therefore equals the sum of $W_1$ and $W_3$ plus the weights $W_2'$ and $W_4'$ which are hereinafter referred to collectively as the total volatile weight in the final dried product.

In accordance with the present invention, it is desired to maintain the solids ratio $W_3/W_1$ substantially constant. This is the ratio of the solid resins weight to the weight of the dry fiber sheet stock. It is further desirable to maintain the volatile ratio $W_2'+W_4'/W_c$ substantially constant. To this end, the present invention provides measuring gauges before and after the coater 14 and drier 16 to provide process signals which can be electronically manipulated. It can be appreciated that other computations involving the resin solid weight $W_3$ can be made to provide one with an indication of the relative quantity of resin in the final product. For example, the resin ratio may be based on the total solids weight of the final sheet and the volatiles ratio may be computed on the dry base weight $W_1$.

Figure 2:
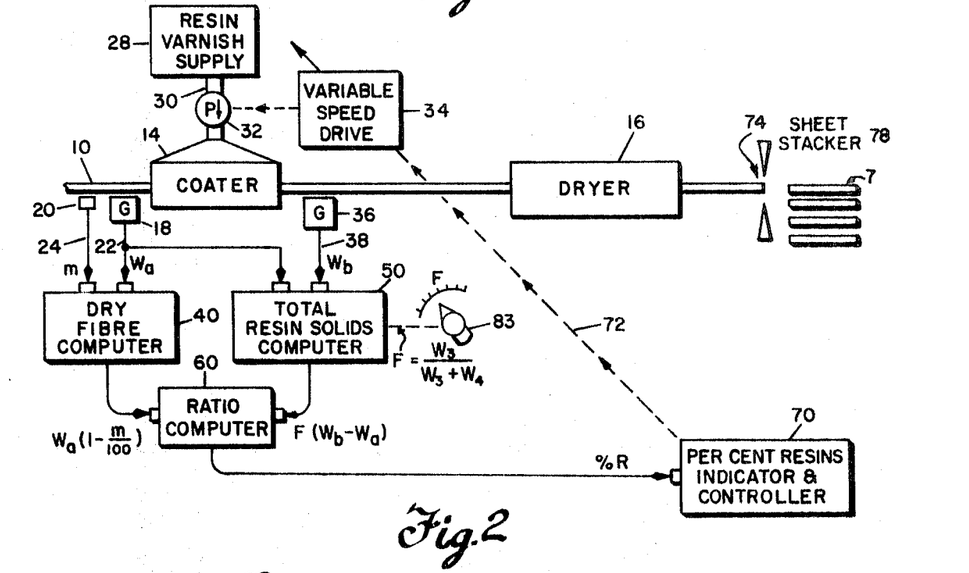
FIG. 2 is a diagrammatic view of one embodiment of the coating measuring and control system of the present invention as applied to the process shown in FIG. 1.

Referring now to FIG. 2, the gauge before the coater 14 comprises a gauge 18 that measures basis weight and a moisture gauge 20 that Delivers signals over lines 22 and 24 respectively. It is recognized that the moisture gauge 18 may not be required if the incoming raw material either is completely dry or contains an insignificant or substantially constant amount of water. The moisture gauge may develop a signal proportional to the moisture content $m=(W_2 \times 100)/(W_1+W_2)$. The coater 14 receives a continuous supply of impregnating varnish from a supply 28 by means of a conduit 30. The mass flow of the impregnating resins into the coater 14 may be adjustable by means of a pump 32 driven by a variable sped drive 34. Another basis weight gauge 36 positioned after the coater provides a signal $W_b$ which is coupled along with the signal $W_a$ from gauge 18. For purposes of simplification, the signal outputs of the respective gauges are designated by the same symbols used for the weights to which each is proportional. The moisture and precoater basis weight signals are coupled to a dry fiber computer 40 which computes the quantity $W_a[(1-m/100)]$. The postcoater weight signal is coupled over line 38 to a total resin solids computer 50.

Into the resin solids computer 50 is dialed a factor $F$ which is the percent resin solids in the varnish mixture pumped from the varnish supply 28 and supplied to the coater 14. The resin solids faction $FW_3/W_3+W_4$ and may be substantially constant for each batch of varnish mixed up. The resin solids computer 50 computes the product, $F(W_b-W_a)$, which is identically equal to the total weight $W_3$ of resin solids added by the coater 14. A signal proportional to this product is coupled to a ratio computer 60 along with the quantity $W_a[1-(m/100)]$ computed by computer 40. The ratio computer 60 provides a signal proportional to the percent resins $$\text{Percent } R = \frac{E(W_b - W_a)}{W_a\left(1 - \frac{m}{100}\right)} \quad (1)$$

This signal may be registered on a percent resins indicator and automatic controller 70 to maintain the percent resins in the impregnated material substantially constant.

The automatic controller 70 may serve to adjust the coater 14. The amount of coating applied can be varied, depending on the type of coater, by adjusting the depth of coating rolls, the spacing of metering rolls or other similar flow controlling mechanisms. In the example illustrated, an adjustment of the variable speed drive unit 34 is made as represented by the linkage indicated by the dotted line 72. Should the desired resin ratio $W_3/W_1$ decrease, the automatic controller 70 would increase the speed of the pump 32 so that more varnish per unit time is delivered to the coater 14. The converse is true should the computed percent resin value be less than a desired value therefor. While it is true that the resin ratio being controlled is that existing in the sheet before it is dried, the same ratio exists in the dried sheet, since no solid material is removed in the drier 16.

A pair of cutter blades 74 cut boards from the continuous length of product emanating from the drier 16. These cut boards are stacked one on top of the other by a stacking unit 78 and thereafter pressed together between a pair of movable jaw members (not shown). If the product is flexible, it may be rolled up.

Figure 3:
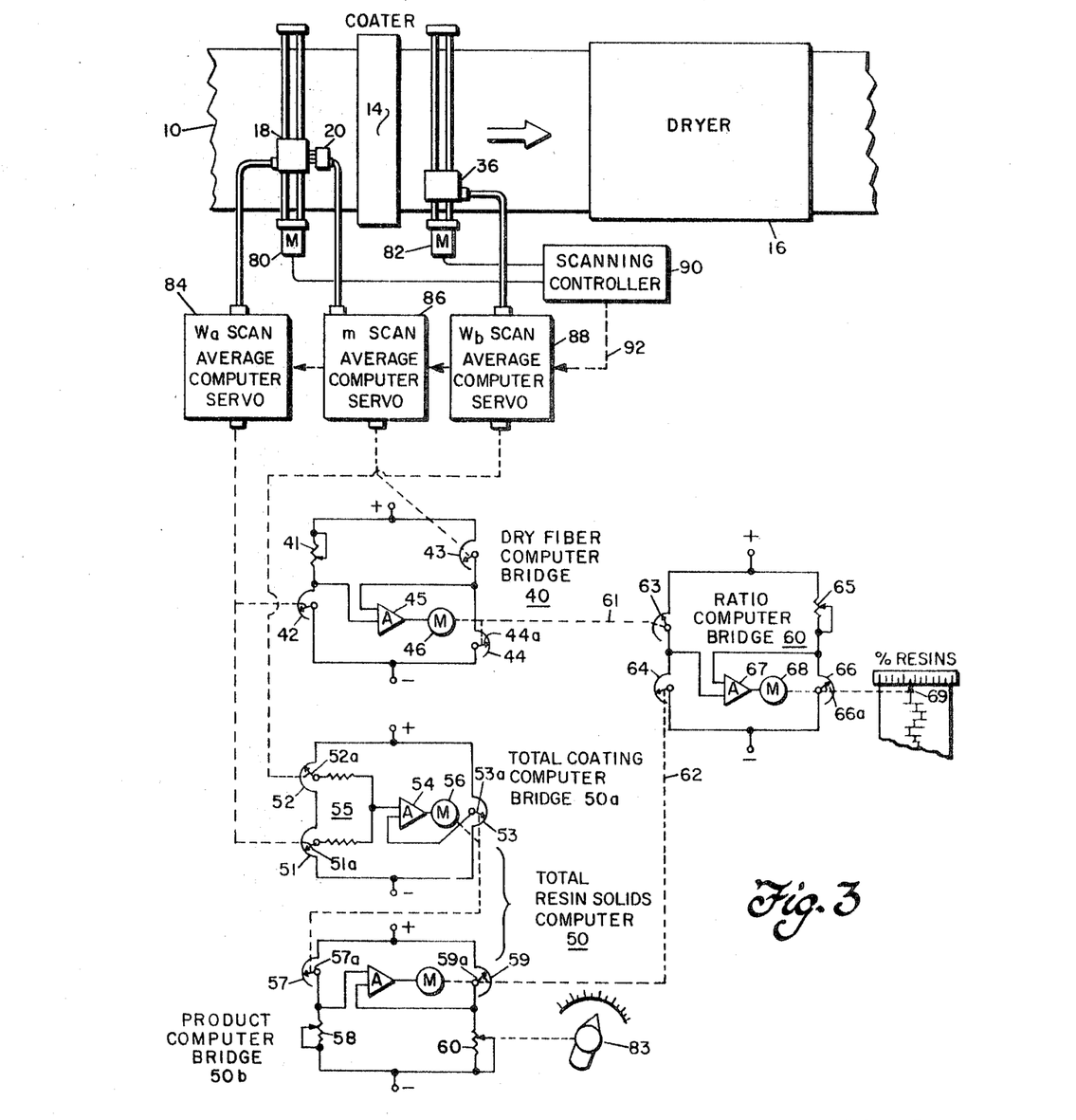
FIG. 3 is a top plan view, partly schematic, showing a portion of the process shown in FIG. 2 and the computer servomechanism system used in connection therewith.

The detailed construction of the gauging systems utilized in the present invention may be seen by referring to FIG. 3. Each of the gauges 18, 20 and 36 may be either located at a fixed point across the width of the sheet 10 or adapted to scan back and forth across the width thereof by means of motors 80 and 82. As a further sophistication, the weight gauges 18, 36 developing signals proportional to $W_a$ and $W_b$ may comprise radiation absorption gauges that may be either of a transmission or backscatter type. Reference may be had to U.S. Pat. No. 2,790,945, issued Apr. 30, 1957, to H.R. Chope for a more detailed description of this type of weight-sensing device. The moisture probe 20 may be mounted onto the side of the gauging head 18 or it may be mounted separately on its own scanning or traversing brackets. Reference may be had to U.S. Pat. No. 3,155,902 issued Nov. 3, 1964 to G.W. Walls for a description of a moisture-measuring system, I have found to provide a useful signal. Both of these patents are assigned to the same assignee as the present invention. Moreover, I have found it advisable, in some instances, to average the measurements of the respective gauges. To accomplish this function, I provide scan average computer servo units 84, 86 and 88 that receive and integrate signals from the gauges 18, 20 and 36.

These units drive slide wire potentiometers in the computer bridges 40 and 50. The angular position of each of the scan average computer servo outputs will be proportional to the average of the cross-sheet weight variations detected by the associated gauging head as computed over the time period required for a full sheet scan. A scanning control unit 90 switching the motors 80, 82 provides the timing base signal to the scan average computers over a route indicated by the dotted line 92. Reference may be had to a copending application Ser. No. 295,337, filed July 16, 1963 for a more complete description of a signal averaging system. This application is likewise assigned to the same assignee as the present invention.

The dry pulp or fiber computer bridge 40 comprises, in one arm, a variable resistor 41, and a repeat slide wire 42 coupled to the $W_a$ servo 84 and, in the other arm, a moisture repeat slide wire 43 and a dry fiber solution slide wire 44. A servoamplifier 45 and servomotor 46 are connected across the bridge 40 to position the dry fiber solution slide wire arm 44a until a null voltage condition exists across the bridge 40. The bridge-operating potential is omitted for purposes of simplicity from all of the computer bridges shown in FIG. 3, but it may be simply a battery connected to the terminals indicated by the plus and minus signs. It will be apparent to those skilled in the art that the position of a fiber slide wire arm 44a will be proportional to the dry fiber value computed from the signals $W_a$ and percent moisture $m$.

The resin solids computer 50 comprises two computer bridges, one a total coating computer bridge 50a and the other, a product computer bridge 50b into which the resin solids fraction F may be dialed by means of a knob 83. The $W_a$ and $W_b$ signals from computer servos 84 and 88 drive a pair of slide wire potentiometers 51, 52 connected in one arm of the total coating bridge 50a. The other arm of the total coating bridge 50a includes a resin coating solution slide wire potentiometer 53. Signals from the arms 51a and 52a of the weight computer servos slide wires are coupled into one input of a servoamplifier 54 by means of summing resistors 55. The other input to the servoamplifier 54 is connected to the arm 53a of the total coating solution slide wire 53. A servomotor 56 drives the arm 53a of this solution slide wire so that its position is indicative of the difference between the weights $W_a$ and $W_b$. A repeat slide wire potentiometer arm 57a is also coupled to the total coating solution slide wire arm 53a. The repeat slide wire 57 is connected in series with a variable resistance 58 to form one arm of the product computer bridge 50b, The other arm of this bridge includes a resin solids solution slide wire 59 and a solids fraction potentiometer 60. The usual servoamplifier and motor serve to drive the arm of the total resin solids solution slide wire 59 to maintain bridge at balance whereupon the position of the arm 59a is proportional to the product of the solids fraction F and the total coating ($W_b-W_a$).

The ratio computer bridge 60 is mechanically connected to the solution slide wires in both the dry fiber computer bridge 40 and the resins solids computer bridge 50 by means of dotted lines 61 and 62, respectively. Repeat slide wires 63 and 64 are connected in series in one arm of the ratio computer bridge 60. The other arm of this bridge includes a variable resistor 65 and a percent resins solution slide wire potentiometer 66. Again, a servoamplifier 67 and motor 68 connected across the bridge 60 drive the percent resins solution slide wire arm 66a to maintain the bridge 60 at balance whereupon the angular position of the slide wire arm 66a is proportional to the percent resins computed in accordance with the formula stated hereinabove by equation (1). A movable marker 69 may be mechanically coupled to the percent resin slide wire arm 66a to indicate the computed percent resins on a moving chart.

Since the operation of the various computer bridge circuits described hereinabove will be apparent to those skilled in the art, no explanation of their operation is deemed necessary.

It may be desirable to record not only the percent resin signal, but also any of the other values computed. To this end, a marker indicator can be coupled to each of the arms of the solution slide wires 44, 53 and 59. Likewise while a scan average measuring technique is described, it may be desirable to operate on the instantaneously developed signals as well. Not only may the position of the solution slide wire arm 66a be used to indicate the computed value of percent resin, but it may also be used to provide an input signal to a coater control system.

Figure 4:
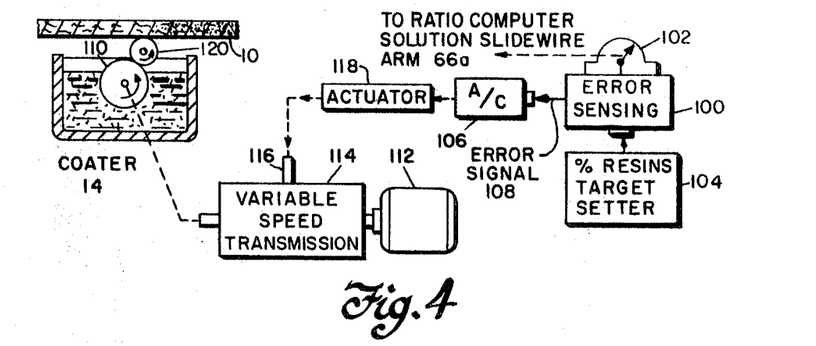
FIG. 4 is a diagrammatic view, partly in section, showing a resin control system useful in controlling the process shown in FIG. 2.

Referring now to FIG. 4, an error sensing unit 100 receives one signal generated from a repeat percent resin slide wire 102 and another signal developed by a target setter 104 proportional to a desired value for the percent resin. Any difference between the two signals will energize an automatic controller 106 with an error signal 108. If the coater 14 is of the typical reverse roll type, a speed adjustment of the pickup roll 110 in accordance with the error signal 108 will provide one means for adjusting the mass per unit of impregnating varnish solution applied to the base sheet 10.

In the illustrated example, a drive motor 112 may be connected to a variable-speed transmission unit 114 coupled to the pickup roll 110. The variable-speed transmission 114 may have a control shaft 116, the angular position of which determines the ratio of the pickup roll speed to the speed of motor 112. The control shaft 116 is coupled to the controller 106 by means of an actuator member 118. If a large is detected by the sensing unit 100, the speed of the pickup roll 110 will increase so that more and more impregnating materials are delivered to an applicator roll 120 that transfers the same to the sheet 10. Of course, if a smaller percent resin error exists, the speed of the pickup roll 110 is decreased thereby reducing the resin solids weight $W_3$ deposited on the sheet. This assumes, of course, as the percent solids fraction F of the batch remains substantially constant. If it does not, then apparatus similar to that shown in FIG. 5 may be advantageously applied.

Figure 5:
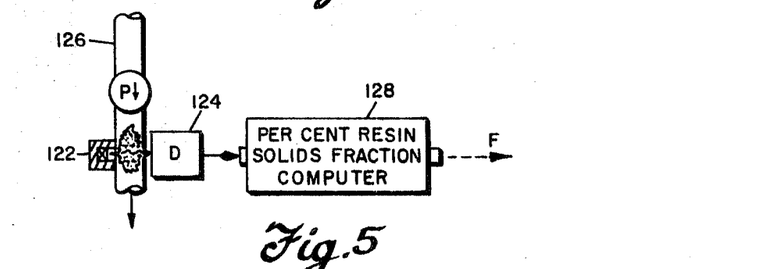
FIG. 5 is a diagrammatic view of a percent resin solids gauge for monitoring the flow of impregnating materials.

In FIG. 5, a radiation source 122 and a detector 124 are positioned on resin supply conduit 126 to determine the percent resin solids F that are being pumped into the coater 14. What is essentially made is a radiation density measurement that determines the bulk or apparent density of the varnish mixture supplied through the conduit 126. This density signal is proportional to the weight of solids in the flow. A computer 128 connected to detector 124 provides a signal proportional to the resin solids weight fraction F of the varnish. The signal F from the computer 128 may drive the arm of a slide wire replacing the potentiometer 60 located in the resin solids computer bridge 50 shown in FIG. 3.

With the percent resins controlled at the desired value, it is appropriate to consider the application of the measurement and control of the percent volatiles in the final dried sheet. It can be observed from the graphical illustration of FIG. 1 that the percent volatiles may be computed by subtracting the total solids in the dry sheet from the total weight of the dry sheet. It is apparent that the amount of solids in the final dry sheet can b obtained from the signals derived before the sheet is dried. For the dried sheet volatiles computation, however, it is appropriate to add a third gauge at the output of the drier to determine the total weight of the sheet at this point in the process. Alternatively, if the amount of volatiles being added by the coater 14 is known, it is only necessary to measure before and after the drier 16 to get either the percent volatiles in the final sheet or the amount vented through the drier to recovery apparatus not shown.

Figure 6:
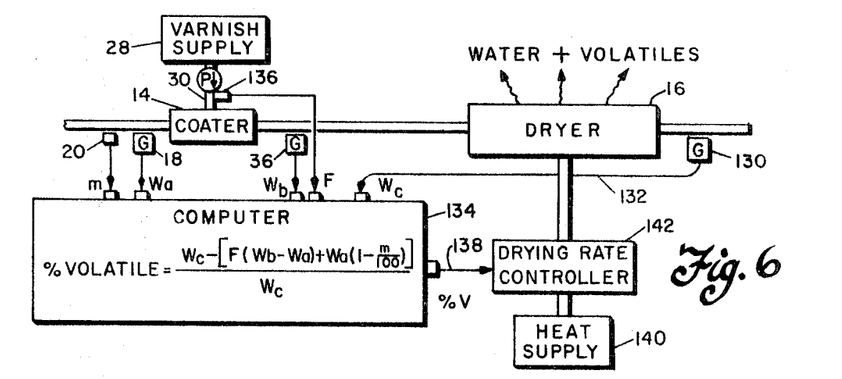
FIG. 6 is a diagrammatic view of the process shown in FIG. 1 illustrating an embodiment of my percent volatile measurement and control system.
Figure 7:
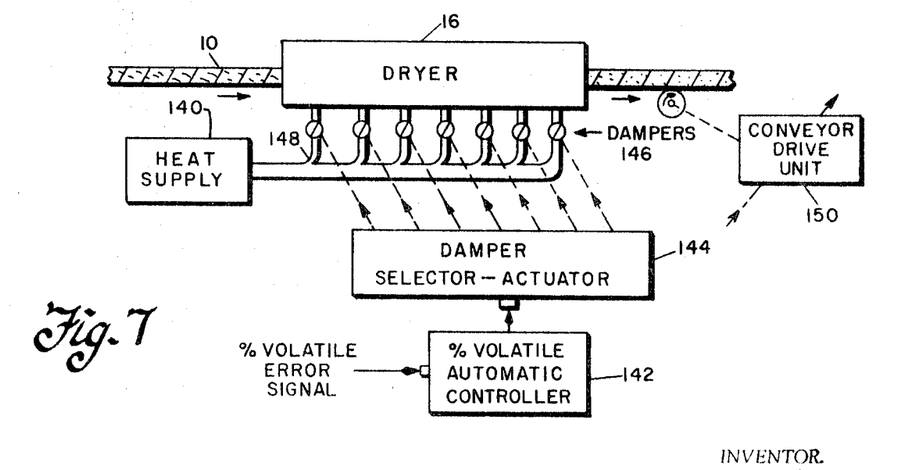
FIG. 7 illustrates one form of drier control system constructed in accordance with the present invention.

Referring to FIGS. 6 and 7, I provide a weight gauge 130 that provides a signal proportional to $W_c$ over line 132 to a computer 134 that computes the percent volatiles $$\text{Percent } V = \frac{W_c - \left[ F(W_b - W_a) + W_a\left(1 - \frac{m}{100}\right) \right]}{W_c} \quad (2)$$

Computer 134 receives all the other required signals from the gauges 18, 20 and 36. The percent resin solids fraction signal F is developed by a density transducer 136 monitoring the flow into the coater 14. Computer 134 provides a signal on line 138 proportional to the percent volatiles. This signal may be indicated on a separate recorder chart or used to adjust the drying rate of the drier unit 16. The amount of heat per unit time coupled to the drier 16 from a heat supply 140 is controlled by a controller unit 142. Automatic controller 142 serves to adjust the drying rate of the drier 16 so as to drive off enough volatiles and water to get the percent volatiles down to required target. The more heat supplied to the drier 16 per unit time, the lower the percent volatiles will be. This control feature is more clearly shown in FIG. 7 wherein automatic controller 142 adjusts the drier 16 through a selector actuator mechanism 144. A plurality of dampers 146 or other heat flow devices direct heat from supply 140 into the drier 16 through a mainfold extending down the length of the drier 16. Alternatively, it may be desirable to alter the speed with which the sheet is conveyed through the drier 16 by changing the speed of the conveyor drive unit 150. In this manner, it is possible to control or program the drying rate of the impregnated sheet in accordance with the difference between the desired percent volatiles and the measure value computed at 134 in accordance with the formula state above by equation (2). It is appreciated, of course, that other volatile content computations may be made and that control based on these other computations in some processes may be more advantageously employed instead of the one I have found to be more preferable.

In summary, it can be seen that my measuring and control system provides an improved product control over the exemplary resin-impregnating process. Both the effect of the long transport time through the drier and the problem of an indeterminate percent moisture of the raw input material being supplied to the process are eliminated by my novel methods.

While a particular embodiment of this invention has been illustrated, the invention is not limited thereto; since many modifications may be made both in the circuit arrangement and in the instrumentalities employed, the true spirit and scope of the invention is defined by the following claims:

I claim:

1. The method of determining the percent resin content of a fibrous host material impregnated by a resin-bearing solution having a substantially fixed percent resin solids concentration, said method comprising the steps of:

measuring said host material before impregnation thereof to produce a first instrument response indicative of the weight of the material, and modifying said first response in accordance with an indication of the moisture content of the material to produce a modified first instrument response indicative of the dry weight of said host material, before impregnation, measuring said impregnated material to produce a second instrument response indicative of the total weight of said impregnated material, providing an indication of said fixed percent resin solids concentration and mathematically combining said modified first and said second instrument responses and said fixed percent resin solids concentration indication to produce a computer response indicative of said percent resin content.

2. The method of determining the percent resin content of a fibrous host material having a variable moisture content and impregnated by a resin-bearing solution having a variable percent resin solids concentration, said method comprising the steps of:

measuring said host material before impregnation thereof to produce a first instrument response indicative of the weight of the material, and modifying said first response in accordance with an indication of the moisture content of the material to produce a modified first instrument response indicative of the dry weight of said material before impregnation, measuring said impregnated material to produce a second instrument response indicative of the total weight of said impregnated material, measuring said solution to produce a third instrument response indicative of the percent resin solids concentration of said solution, and mathematically combining said modified first, said second and said third instrument responses in accordance with a predetermined functional relationship to provide a signal proportional to said percent resin content of said impregnated material.

3. The method of measuring the percent volatiles in a material impregnated by a resin-bearing volatile carrier and drier in a heating unit to drive off a portion of said volatile carrier, said method comprising the steps of:

measuring the weight of said material before and after it is impregnated and before it is dried to provide two instrument responses indicative of said two weight measurements, providing a first indication of the volatile content of the material before it is impregnated, and a second indication of the percent resins in said carrier computing the total weight of solids in said impregnated material before it is dried, in response to said two instrument responses and said two indications, to produce a total solids weight response, measuring said dried material to produce a third instrument response indicative of the weight thereof, computing a different response indicative of the different between said third instrument weight response and said total solids weight response, and computing the ratio of said computed difference to one of said dried material and total solids weights.

4. The method of controlling a fibrous host material treating process including a coater for impregnating said material with a resin-bearing volatile mixture having a variable percent resin solids concentration and a dryer for drying said material, said method comprising the steps of:

measuring the dry weight of said host material, measuring the weight of said impregnated material before said dryer, measuring the percent resin solids concentration of said volatile coating mixture, combining said measurements in accordance with a predetermined functional relationship to provide a signal proportional to said percent resin content of said coated material, and controlling the rate of impregnation of said material by said coater in accordance with said signal.

5. The method of controlling a fibrous material treating process including a coater for impregnating a host material with a resin-bearing volatile solution having a variable percent resin solids concentration and a dryer for drying said material, said method comprising the steps of:

measuring the dry weight of the said host material before impregnation, measuring the total weight of said impregnated material before said dryer, measuring the percent resin solids concentration of said coating solution, combining said measurements in accordance with a predetermined functional relationship to provide a signal proportional to said percent resin content of said coated material, controlling the rate of impregnation of said material by said resin solution in accordance with said resin content signal, measuring the weight of said dried impregnated material, computing the total solids weight of said dried material from said measurements, forming the difference between said dried material weight and said computed total solids weight thereof to provide an output signal proportional to the amount of volatiles present in said dried material, and controlling the drying of said material in accordance with said output signal.

6. In a sheet-treating process wherein a raw sheet of variable moisture content is impregnated by a volatile solution having a predetermined percent of resin solids and dried in a heating unit to remove a portion of said moisture and said volatiles, apparatus for controlling the amount of resins present in said treated sheet comprising:

means for gauging the weight and moisture content of said raw sheet containing moisture and for combining the gauge responses so as to obtain a measurement of the dry weight of said sheet before said resin impregnation, means for gauging the weight of said impregnated sheet before said heating unit, to provide a measurement of the impregnated but undried sheet, means providing an indication of said predetermined percent resin solids in said solution, computer means responsive to said measurements and to said indication in accordance with a predetermined functional relationship to provide a control signal indicative of the amount of resins in said dried impregnated sheet, and controller means for varying the rate of said resin impregnation in accordance with said control signal to maintain the percent resin in said dried impregnated sheet substantially uniform.

7. In a sheet-treating process wherein a raw sheet containing moisture is impregnated by a volatile solution having a variable resin solids content and dried in a heating unit to remove a portion of said moisture and said volatiles, apparatus for controlling the amount of resins present in said treated sheet comprising:

first gauge means mounted adjacent to said raw sheet for producing a weight response thereto which is decreased according to sheet moisture content so as to provide a measurement of the dry weight of said raw sheet, second gauge means mounted before said heating unit and adjacent to said impregnated sheet for providing a measurement of the weight thereof, third gauge means responsive to said volatile solution for producing a measurement of the resin solids content thereof, controller means for adjusting the impregnation of said sheet in accordance with said weight and resin solids content measurements provided by said first, second and third gauge means, fourth gauge means mounted after said heating unit and adjacent to said impregnated sheet for providing a measurement of the weight of said dried impregnated sheet, means responsive to said first, second and third gauge means for providing a computed measurement of the total solids weight of said impregnated sheet, and means responsive to said dried impregnated sheet weight measurement and the total solids weight measurement for controlling the rate of drying of said impregnated sheet to maintain the percent volatiles therein substantially constant.

8. In a sheet-treating process wherein a raw sheet having a variable moisture content is impregnated at a variable rate by a volatile solution having a variable percent resin solids applied to said raw sheet and wherein said impregnated sheet is passed through a heating unit to dry said sheet by driving off a portion of said moisture and said volatiles from said impregnated material, control apparatus for maintaining the percent of said resin in said dried sheet, said apparatus comprising:

a first radiation gauge for measuring the weight of said raw sheet, a moisture gauge for measuring the moisture content of said raw sheet, means for computing from said raw sheet measurements a signal proportional to the dry weight of said raw sheet, a second radiation gauge positioned before said heating unit for measuring the weight of said impregnated sheet, means for computing the different between the measurements of said first and said second gauges to determine the weight of said impregnating resin solution, transducer means for measuring the percent resin solids of said impregnating solution, means for forming the product of said measured percent resin solids and said computed solution weight to determine the weight of resin solids added to said sheet, a first ratio computer for forming the ratio of said total resin solids weight to said dry weight of said raw sheet to derive a signal proportional to the amount of resin in said impregnated sheet, and means for varying the rate of resin impregnation in accordance with said resin signal.

9. In a sheet-treating process wherein a raw sheet having a variable moisture content is impregnated at a variable rate by a volatile solution having a variable percent resin solids applied to said raw sheet and wherein said impregnated sheet is passed through a heating unit to dry said sheet by driving off a portion of said moisture and said volatiles from said impregnated material, control apparatus for maintaining the relative amounts of said resin and said volatiles in said dried sheet constant, said apparatus comprising:

a first scanning radiation gauge for measuring the average weight of said raw sheet, a scanning moisture gauge for measuring the average moisture content of said raw sheet, means for computing from said measurements a signal proportional to the average dry weight of said raw sheet, a second scanning radiation gauge positioned before said heating unit for measuring the average weight of said impregnated sheet, means for computing the difference between the measurements of said first and said second scanning gauges to determined the average weight of said impregnating resin solution, transducer means for measuring the percent resin solids of said impregnating solution, means for forming the product of said measured percent resin solids and said computed average solution weight to determine the total weight of resin solids added to said sheet, a first ratio computer for forming the ratio of said total resin solids weight to said average dry weight of said raw sheet to derive a signal proportional to the amount of resin in said impregnated sheet, means for varying the rate of resin impregnation in accordance with said resin signal, a third scanning radiation gauge for measuring the average weight of said dried impregnated sheet, means for computing the difference between said dry impregnated sheet average weight and the sum of said raw sheet average dry weight and said total solids weight to provide a signal proportional to the average weight of volatiles remaining in said sheet after drying, a second ratio computer for forming the ratio of said computed volatile weight difference to said average weight of said dried impregnated sheet to provide an output signal proportional to the percent volatiles in said dried impregnated sheet, and means for varying the rate of drying of said impregnated sheet in accordance with said output signal to maintain the percent volatiles in said sheet substantially constant.

10. Control apparatus for a material treating process comprising:

means for continuously applying to a raw material a resin-volatile mixture having a predetermined percent resin solids content to impregnate said material, means for measuring the total weight of said mixture applied to said material including a first gauge for measuring the weight of said raw material, a second gauge for measuring the weight of said impregnated material and means for computing the difference between said measured weight values, means for producing an indication of said predetermined percent resin solids content, means responsive to said measured total mixture weight and to said indication for producing a measurement of the weight of resin solids applied to said raw material, and means responsive to said last-mentioned resin solids weight measurement for controlling the amount of said mixture applied to said raw material so as to maintain the weight of said resins in said material substantially constant.

11. Control apparatus for a raw material treating process comprising:

a first gauge for measuring the weight of said raw material, means for continuously applying a resin-volatile mixture having a predetermined percent resin solids content to said material to impregnate the same, means responsive to said first gauge measurement for computing the amount of said solid resins impregnating said material, means for drying said material to drive off a portion of said volatiles therefrom, said drying means including means for adjusting the rate of said material drying to regulate the amount of said volatiles in said dried material, means for measuring the weight of volatiles in said dried material including second gauge means for measuring the weight of said dried impregnated material and means for computing said volatile amount from the different between said measured dried impregnated material weight and said computed amount of impregnating resin solids, and control means for actuating said adjustable drying rate means in accordance with said computed volatile signal to maintain the percent volatiles in said dried material substantially constant.

12. Control apparatus for a raw material treating process comprising:

means for continuously coating said raw material with a resin-volatile mixture having a predetermined percent resin solids content, said coating means including adjustable means for applying a controllable amount of said mixture per unit time to said material to vary the degree of impregnation thereof, means for measuring the total weight of said mixture applied to said material including a first scanning gauge for measuring the average weight of said uncoated material, a second scanning gauge for measuring the average weight of said coated material and means for computing the difference between said measured average weight values, means responsive to said computed weight difference value for computing the weight of resin solids impregnating said material, controller means for actuating said adjustable coating means in accordance with said computed resin solids weight value to maintain the percent resin solids in said material substantially uniform, means for drying said material to drive off a portion of said volatiles therefrom, said drying means including means for adjusting the rate of said material drying to regulate the amount of said volatiles in said dried material, means for measuring the weight of volatiles in said dried material including a third scanning gauge means for measuring the average weight of said dried material and means responsive to the difference between said dried material average weight value and said computed weight of said impregnating resin solids for computing said volatile weight, and means for actuating said adjustable dryer means in accordance with said measured amount of volatiles in said dried material to maintain the percent volatiles therein substantially constant.

13. Control apparatus for a fibrous material treating process comprising:

a roll coating unit having an applicator roll mounted adjacent to said material for applying a resin-volatile solution having a predetermined percent solid resins content thereto, means for driving said applicator roll at a variable speed to vary the amount of resin impregnating said material, a first traversing gauge system mounted upstream from said coating unit for developing a first signal proportional to the average dry fiber weight of said uncoated material, a second traversing gauge mounted downstream from said coating unit and adjacent thereto for developing a second signal proportional to the average weight of said coated sheet, means for producing a signal indicative of said predetermined percent resin solids content of said resin-volatile solution, computer means receiving said first and second traversing gauge signals and said resin-solids percent signal to compute the ratio of the total resin solids present in said coated material to said average dry fiber weight, and automatic resin control means responsive to said computed ratio for actuating said applicator roll speed adjusting means whenever said computed ratio deviates from a desired value therefor.

14. Control apparatus for a fibrous material treating process comprising:

a roll coating unit having an applicator roll mounted adjacent to said material for applying an impregnating resin-volatile solution having a predetermined percent solid resins content thereto, means for driving said applicator roll at a variable speed for varying the amount of resin impregnating said material, a dryer unit for drying said impregnated material to drive off a portion of said volatiles, a first transversing gauge system mounted upstream from said coating unit for developing a first signal proportional to the average dry fiber weight of said uncoated material, a second traversing gauge mounted downstream from said coating unit and immediately adjacent thereto for developing a second signal proportional to the average weight of said coated sheet, a third traversing gauge mounted downstream from said dryer unit for developing a third signal proportional to the average weight of said dried impregnated material, a computer system receiving said all of said gauge signals for computing the ratio of the weight of volatiles in said dried impregnated sheet to said average weight thereof, and automatic volatile control means responsive to said computed volatile weight ratio for varying the drying rate of said dryer oven in order to maintain the percent volatiles in said dried impregnated sheet substantially constant.

15. Apparatus for measuring the percent resin content of a fibrous host material having a variable moisture content and impregnated by a resin-bearing solution having a variable percent resin solids concentration, said apparatus comprising:

means for measuring said host material to produce a first instrument response which is compensated for said moisture content and thereby indicative of the dry weight of said material before impregnation, means for measuring said impregnated material to produce a second instrument response indicative of the total weight thereof, means for measuring said solution to produce a third instrument response indicative of the percent resin solids concentration thereof, and computer means for mathematically combining said instrument responses in accordance with a predetermined functional relationship to provide a signal proportional to said resin content of said impregnated material.

16. Apparatus for measuring the percent volatiles in a moisture-bearing material impregnated by a resin-bearing volatile carrier having a known percent resin solids and volatile concentration, said impregnated material being dried in a heating unit to drive off a portion of said moisture and of said volatile carrier, said apparatus comprising:

means responsive to the material before it is dried in said heating unit for producing a measurement of the impregnated material which is compensated for moisture and for the percent volatiles therein, which measurement is thereby indicative of the dry weight of said undried impregnated material, means responsive to the impregnated material after it is dried to produce a measurement of the weight of said dried impregnated material, and means for computing said percent volatiles in response to both of said weight measurements.

17. Control apparatus for a material-treating process, comprising:

means for continuously applying a resin-volatile mixture to said material to impregnate the same, means for measuring the percent resin solids content of said mixture, means for measuring the total weight of said mixture applied to said material, means for computing the weight of said solid resins impregnating said material from said total weight measurement and said percent resin solids measurement, and controller means responsive to said computed resin weight for adjusting the amount of said mixture applied per unit time to maintain the weight of said solid resins in said material substantially constant.

18. Apparatus for a material-treating process wherein a host material having a variable moisture content is impregnated with a second impregnating material including a solid material dissolved in a solvent, comprising:

means for measuring the dry weight of said host material containing moisture including:

means for measuring the total weight of said host material, means for measuring the moisture in said host material, and means for measuring the weight of the solids in said impregnating material applied to said host material, and means for combining said measurements to provide a control signal proportional to the weight of the solids in said impregnating material applied to said host material relative to the dry weight thereof.

19. Apparatus for controlling the percent resin content of a fibrous host material having a variable moisture content wherein said host material is impregnated with said resin, in the form of a mixture of resin solids and a volatile carrier said apparatus comprising:

means for measuring a host material containing moisture to obtain the dry weight thereof including:

means for measuring the total weight of said host material, means for measuring the moisture content of said host material, means for measuring the weight of the resin solids in said impregnated material to provide a second signal proportional thereto, means for combining said signals to provide a control signal proportional to the percent resin solids in said impregnated material relative to the dry weight of the host material, and control means responsive to said control signal for varying the rate of resin impregnation of said host material.

20. The subcombination of claim 7 wherein said first gauge means includes means for measuring the moisture in said raw sheet.

21. In combination with apparatus through which a traveling raw sheet is passed for depositing on said sheet a treating material having a substantially nonvolatile component mixed with a first volatile component to form a treated sheet, first gauge means responsive to the raw sheet for producing a first signal indicative of the untreated weight thereof, second gauge means responsive to the treated sheet for producing a second signal indicative of the treated weight thereof, means providing a first indication of the weight fraction of one of said components contained in said treating material, and means receiving said signals and said indication for computing therefrom a response indicative of the weight of one of said treating material components contained in said treated sheet.

22. Apparatus as in claim 21 wherein said means providing said weight fraction indication comprises gauge means responsive to said treating material before it is deposited on said raw sheet, and wherein said weight fraction indication comprises a signal from said gauge.

23. Apparatus as in claim 21 wherein said raw sheet contains a second volatile component, said apparatus comprising means providing a second indication of the amount of said second volatile component to said computing means, and wherein said computed response is indicative of the relation of the weight of said one treating material component to the weight of said raw sheet exclusive of the weight of said second volatile component therein.

24. Apparatus as in claim 23 wherein said means providing said second indication comprises gauging means measuring said raw sheet before it is treated, and wherein said second indication comprises a signal from said gauge.

25. Apparatus as in claim 21 wherein said apparatus includes means for driving off some of said volatile component from said treated sheet to form a sheet which is partly devolatilized, and further comprising third gauge means responsive to said devolatilized sheet for providing to said computing means a third signal indicative of the weight of the devolatilized sheet, and wherein said computing means further produces a second response indicative of the portion of volatile material remaining in said devolatilized sheet.

26. Apparatus as in claim 25 wherein said raw sheet contains a second volatile component, said apparatus comprising means providing to said computing means a second indication of the amount of said second volatile component contained in said raw sheet, whereby at least one of said computer responses is compensated for errors which might otherwise exist due to the presence of the second volatile component in the raw sheet.

Disclaimer 3,596,071.—*George I. Doering*, Columbus, Ohio. METHOD AND APPARATUS FOR A MATERIAL TREATER. Patent dated July 27, 1971. Disclaimer filed July 12, 1974, by the assignee, *Industrial Nucleonics Corporation*.

Hereby enters this disclaimer to claims 3, 5, 7, 8, 9, 11, 12, 13, 14, 16, 25 and 26 of said patent.

[*Official Gazette May 27, 1975.*]